March 13, 1962 — C. B. SKRMETTA — 3,024,490
SHRIMP WASHER AND PEELER
Filed March 25, 1959 — 2 Sheets-Sheet 1

Cecil B. Skrmetta
INVENTOR.

March 13, 1962  C. B. SKRMETTA  3,024,490
SHRIMP WASHER AND PEELER
Filed March 25, 1959  2 Sheets-Sheet 2
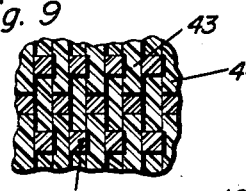
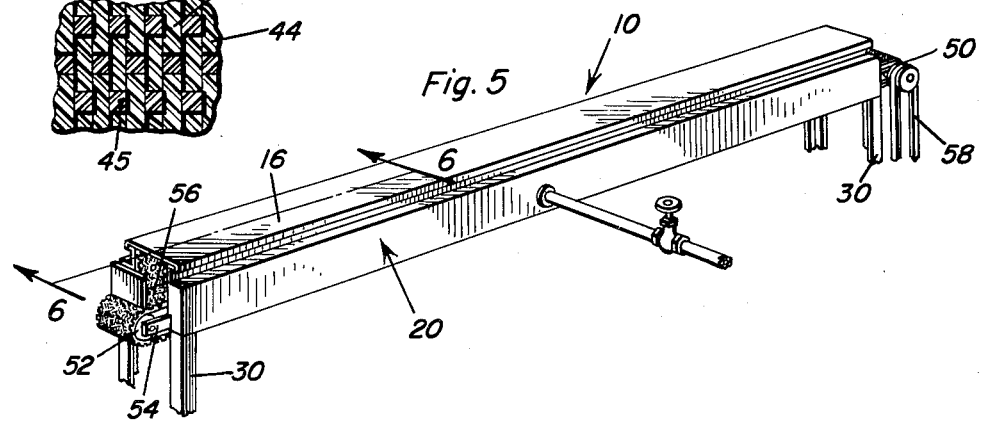
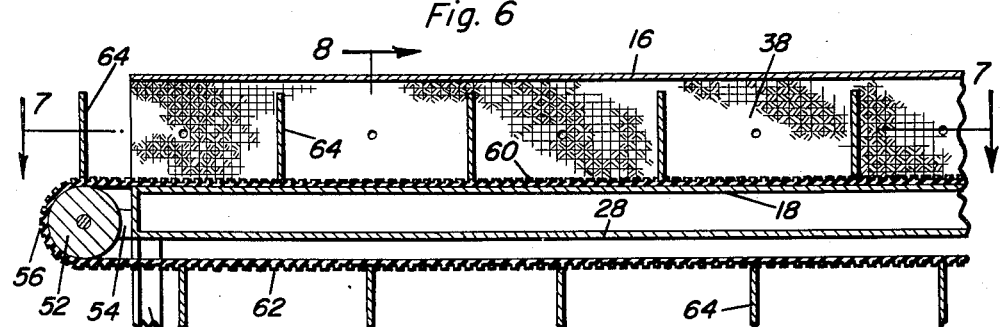
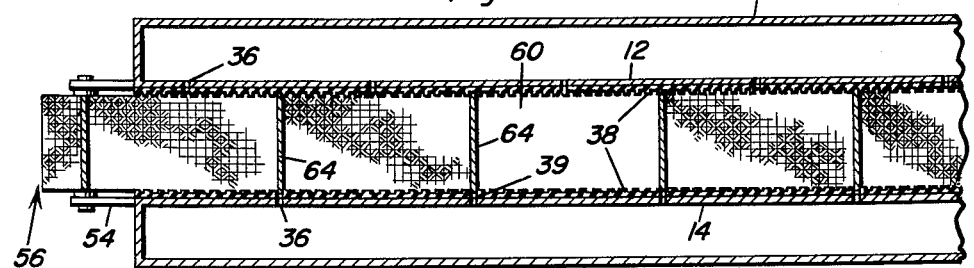
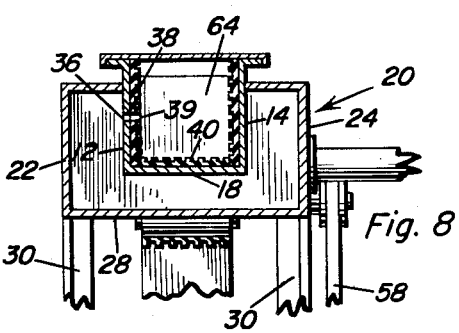
Cecil B. Skrmetta
INVENTOR.
BY Clarence A. O'Brien
and Harvey B. Jacobson
Attorneys United States Patent Office 3,024,490
Patented Mar. 13, 1962

3,024,490
SHRIMP WASHER AND PEELER
Cecil B. Skrmetta, 3536 Lowerline St., New Orleans, La., assignor of ten percent to Raphael Q. Skrmetta, New Orleans, La.
Filed Mar. 25, 1959, Ser. No. 801,748
16 Claims. (Cl. 17—2)

This invention comprises a novel and useful shrimp washer and peeler, and more particularly relates to a device specifically adapted for use in the cleaning of seafood such as shrimp and crab meat, and constitutes a continuation-in-part of my prior application Serial No. 709,319, filed January 16, 1958, now abandoned and bearing the same title.

The primary object of this invention is to provide an apparatus for effecting a cleaning operation upon seafood such as shrimp, crab meat and the like.

A further object of the invention is to provide an apparatus specifically adapted for applying streams of a cleaning fluid such as water to shrimp or seafood as the same travel along an elongated tunnel, trough or channel to thereby remove foreign matter from the seafood and cleanse the same.

A further object of the invention is to provide an apparatus in accordance with the foregoing objects to effect a partial or complete cleaning of shrimp and a partial or complete stripping of the shell therefrom by means of a staggered series of spray nozzles on opposite sides of the elongated path of travel of the strip to thereby throw the shrimp back and forth across the passage during their travel along.

Yet another object of the invention is to provide a cleaning apparatus comprising means for positively conveying shrimp or other seafood through a trough, channel or tunnel and which shall retain the shrimp in compartments during such passage while subjecting the shrimp to the action of cleaning sprays disposed on opposite sides of the trough and directed into and across the compartments containing the shrimp.

A still further object of the invention is to provide an apparatus in accordance with the preceding objects wherein the surfaces of the trough which are subject to engagement by the shrimp during their passage along the trough shall be provided with a roughened or ridged effect to thereby facilitate the loosening of the shell of a shrimp as the latter strike thereagainst during their passage through the trough.

A further and more specific object of the invention is to provide an apparatus in accordance with the preceding objects wherein the rate of travel of the shrimp through a trough, tunnel or channel shall be controlled positively by causing movement of the shrimp through the same by means of a conveyor mechanism; whereby the shrimp or seafood to be cleaned will be retained in separate compartments during such travel through the trough; and whereby the shrimp or seafood contained in such compartments will be repeatedly subjected to staggered cross sprays of water to repeatedly hurl the shrimp from side to side of the trough while being retained in their individual compartments and thereby facilitate the cleaning of the shrimp and the loosening of the shell thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 5 is a perspective view showing a second and more complex embodiment of a cleaning apparatus in accordance with this invention and which includes substantially all of the features of the embodiment of FIGURES 1-4 therein;

FIGURE 6 is a vertical longitudinal sectional detail view taken upon an enlarged scale substantially upon the plane indicated by section line 6—6 of FIGURE 5;

FIGURE 7 is a horizontal sectional view taken substantially upon the plane indicated by section line 7—7 of FIGURE 6;

FIGURE 8 is a vertical transverse sectional view taken substantially upon the plane indicated by section line 8—8 of FIGURE 6; and FIGURE 9 is a fragmentary detail view showing in elevation the construction of the lining of the interior surfaces of the trough and of the conveying belt which may be provided therein.

Figure 1:
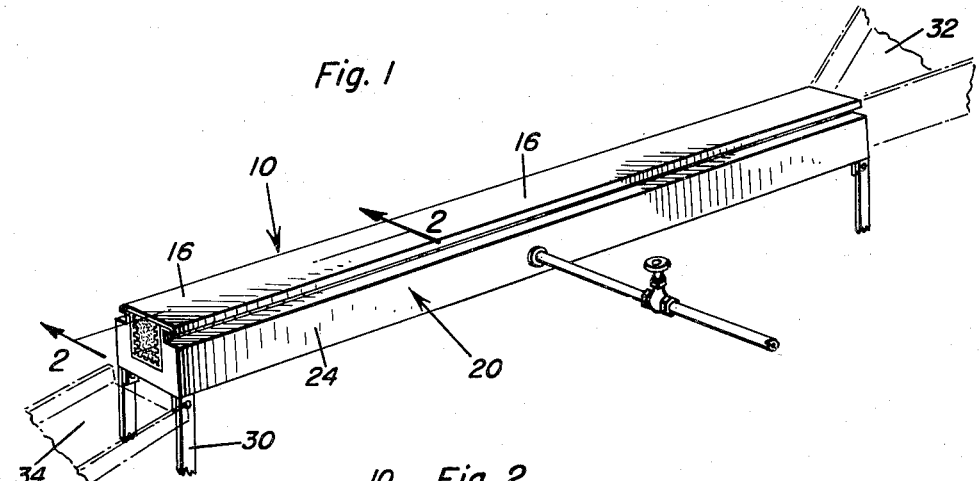
FIGURE 1 is a perspective view showing a suitable and simplified embodiment of apparatus in accordance with this invention for effecting cleaning treatments upon seafood, an inlet trough and a discharge trough for the apparatus being shown in dot-and-dash lines therein.

The primary intent of this invention is to provide an apparatus which will in whole or in part clean seafood in preparation for packaging, and which in particular will cleanse shrimp and remove therefrom the sand vein after the back of the shrimp has been slit and remove or at least loosen the shell of the shrimp to either completely clean the shrimp or in preparation for subsequent treatment of the shrimp by a shrimp cleaning machine of conventional type; and will effectively remove bits of shell and other foreign matter from crab meat and the like.

In the accompanying drawings, the preferred embodiment of the apparatus is shown in FIGURES 5-8, while FIGURES 1-4 disclose the same apparatus but in a somewhat simplified form in which the mechanical conveying means has been omitted or removed therefrom. The detail view of FIGURE 9 relates to a particular lining for the interior of the trough of the device which is utilized with either embodiment.

Inasmuch as the embodiment of FIGURES 1-4 is simpler in construction, description of the same will be first given, after which the preferred and more complex and comprehensive form of FIGURES 5-8 will be in turn described.

As shown in FIGURES 1-4, the seafood cleaning apparatus comprises an elongated member 10 for passage of the seafood therethrough. The member 10 consists of a channel-like structure including side walls 12 and 14 together with a top wall 16 and a bottom wall 18 which in the embodiment illustrated defines a channel-like structure which is substantially rectangular in cross section. As will be observed especially from FIGURE 4, the upper ends or edges of the side walls 12 and 14 are provided with outturned lateral flanges 13 and 15 to which the cover 16 forming the top wall is removably secured in any suitable manner. Conveniently, this cover member may itself include downturned flanges 17 and 19 which thus embrace the lateral flanges 13 and 15.

Figure 2:
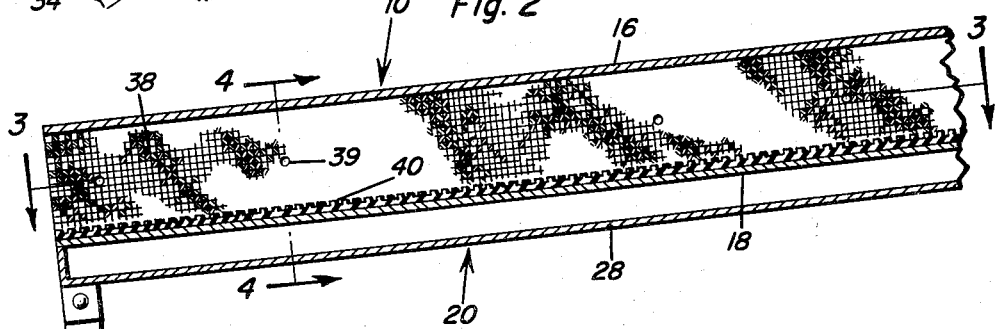
FIGURE 2 is a vertical longitudinal sectional view taken upon an enlarged scale substantially upon the plane indicated by the section line 2—2 of FIGURE 1 and showing a portion of the interior of the cleaning apparatus in accordance with FIGURE 1.

A housing or jacket designated generally by the numeral 20 surrounds and supports the channel-like structure. Thus, the housing includes a pair of side walls 22 and 24 together with a top wall 26 which is secured in any desired manner to the side walls 12 and 14 upon the outside surface thereof in fluid tight engagement therewith and the housing is provided with a bottom wall 23 which underlies the bottom wall 18 in spaced relation to the latter. Suitable supporting legs 30 are secured to the bottom wall of the housing 20 for supporting the latter. As shown in FIGURE 2, the device 10 is preferably supported in an inclined position whereby seafood will be enabled to pass therealong under the influence of gravity either alone or aided by water or cleaning fluid flowing through the channel-like structure upon the bottom wall 18, or aided or effected by the impingement of sprays of cleaning fluid upon the seafood as set forth hereinafter.

As diagrammatically indicated in FIGURE 1, the elongate channel-like structure has an inlet and outlet means, these comprising a trough 32 or other means for feeding seafood, such as shrimp, to the inlet end of the channel and a further trough 34 or other means for receiving the seafood discharged by the channel after its passage therethrough.

Figure 3:
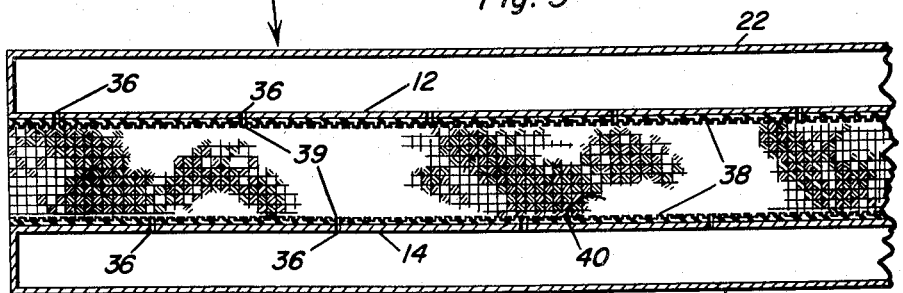
FIGURE 3 is a horizontal sectional detail view taken substantially upon the plane indicated by section line 3—3 of FIGURE 2 and showing the particular relation of the side and bottom walls and of the water supply headers of the trough.

Referring now especially to FIGURE 3, it will be seen that the two sides walls 12 and 14 of the channel-like structure are provided with longitudinally spaced apertures 36 comprising fluid inlet means, the apertures of the two side walls being staggered with respect to each other. Preferably these apertures are mounted at an appropriate distance or location between the top and bottom walls 16 and 18 in a position for throwing a spray across the channel-like structure from one side to the other thereof and causing shrimp or seafood passing along the channel-like structure to be repeatedly hurled back and forth from one side to the other. The apertures 36 constitute orifices by which the cleaning fluid is laterally injected into the structure 10. In some instances, cleaning fluid such as water may be applied by the header to each of these apertures, although in other instances other fluids such as air may be employed. The primary purpose, however, of the apertures 36 and the fluid introduced thereby into the interior of the channel-like structure is to produce a boiling or agitation of the water accompanying the shrimp during their travel through the structure; to impart a lateral thrust to the shrimp passing through the structure to repeatedly hurl the same from side to side thereof during the passage along the structure.

In my above identified co-pending application, the fluid inlet means 36 were described as constituting adjustable nozzles in that their angular relation to the longitudinal center line of the structure could be adjusted or varied. It is to be understood that the same construction and the same adjustability may be provided for the apertures 36 shown in FIGURES 1–4 herein, and that the axes of the openings 36 may be given any fixed direction desired to thus introduce or inject the fluid into the channel-like structure and across the same at any selected angle with respect to the longitudinal axis of the same.

It is contemplated that any desired pressure may be employed for introducing the fluid through the fluid inlet means 36 by means of the header or jacket 20, as for example 65 lbs. which is a conventional city water pressure and is readily available.

In operation, shrimp or other seafood discharged by the chute 32 into the inlet end of the device 10 will pass along the inclined floor 18 of the same either under the influence of gravity alone, or by a conveying stream of liquid, or under the force of appropriately directed streams from the fluid inlet means 36. During this passage the seafood will be also driven back and forth transversely across the structure, thereby imparting a tumbling action to the same and in the case of shrimp, enabling the successive streams of cleaning fluid to repeatedly engage different portions of the shrimp whereby to loosen and strip the shell from the shrimp, or to remove and cleanse the sand vein if the backs of the shrimp have been previously slit in any desired manner.

Figure 4:
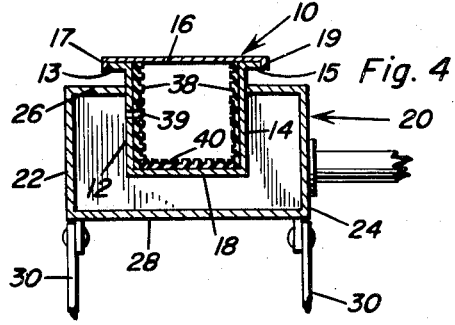
FIGURE 4 is a vertical transverse sectional view taken substantially upon the plane indicated by section line 4—4 of FIGURE 2.

In the apparatus as disclosed in my above mentioned co-pending application, in FIGURES 1–4 therein, the interior surfaces of the walls and bottom of the trough were bare. It has been found, however, superior results can be obtained if one or more of these surfaces are lined with a rough crinolated material. Thus, as shown in FIGURES 2–4 in particular, there are provided a pair of linings as at 38 for the two side walls 12 and 14, which are secured thereto in any desired manner and preferably extend throughout the entire length and the entire extent of these vertical side walls, and which may have apertures as at 39 which register with the fluid inlet means 36 previously mentioned. In addition, there is provided a further lining as at 40 for the bottom wall 18 which likewise may extend across the entire width and along the substantially entire length thereof.

Referring now to FIGURE 9 it will be observed that the material which is employed for the lining 38 and 40 consists preferably of a single continuous sheet of strip or a material such as rubber belting or the like, as indicated by the numeral 44, and which includes a plurality of raised ribs or ridges as at 43 together with intermediate raised projections 45. There is thus produced a roughened or ridged effect or surface upon this belting material which facilitates the loosening of the shell from the shrimp as the latter are repeatedly thrown from one side to the other and rub against the surfaces of this lining material.

Although in some instances the arrangements shown in FIGURES 1–4 may be satisfactory and represents a more economical construction, the more complete form of apparatus in FIGURES 5–8 is preferred. In this latter form of apparatus, the construction is in part identical with that previously described and accordingly the same numerals have been applied to the same elements. However, in the preferred form of apparatus there is also provided a conveying means for positively moving the shrimp or seafood through the cleaning channel-like structure; whereby the speed of travel of the shrimp therethrough can be more positively regulated, and further whereby the shrimp or seafood may be retained in separate batches of controlled quantity in individual compartments during the travel of the shrimp or seafood through the device. For this purpose, the conveying means performing these functions includes a pair of supporting rollers 50 and 52 suitably mounted upon supporting brackets 54 at the inlet and outlet ends of the apparatus and over which a conveyor belt 56 of any desired character is entrained. One of these rollers, as the inlet roller 50 may be driven in any suitable manner as by a belt 58 from any suitable source of power, not shown, whereby travel of the belt at a controlled rate, either uniform or variable, is effected in a conventional manner.

This belt may consist of the belting material shown in FIGURE 9 and described in connection with the embodiments of FIGURES 1–4, the upper flight of this belt thus constituting the bottom wall of the structure and serving the same function as the previously mentioned bottom wall 18 having the lining 40.

The belt is disposed so that its upper flight 60 passes through the cleaning channel-like structure, but its lower flight 62 is disposed therebeneath, and also beneath a bottom wall 28 of the casing, jacket or manifold 20. The fluid inlet means arrangement is identical with those previously described.

It is preferred to mount upon the conveyor belt compartment means whereby separate batches of shrimp may be retained together during their passage through the cleaning structure. For this purpose, a series of spaced partitions or blades 64 are carried by the flights 60 and 62 of the belt 56 and these blades, as shown in FIGURE 7, extend substantially entirely across the space between the two side walls 12 and 14 of the structure. The space between adjacent blades 64, the top wall 16 and the upper flight 60 defines separate compartments which are open at their sides to the action of the fluid inlet means 36 on opposite side walls of the structure. Thus, the shrimp or seafood is maintained in separate group or batches during its passage through the cleaning structure and is subjected to the successive action of oppositely disposed and staggered fluid inlet means to thus thoroughly agitate and throw the seafood from side to side during its passage along the structure for effectively cleansing the meat and separating the foreign matter therefrom.

After the seafood has passed through the structure, and is discharged upon the previously mentioned discharge chute 34, the same may be subsequently treated to separate therefrom the foreign matter removed by the cleansing action.

It should be noted that in view of the texture and character of the meat of shrimp in particular, it is a difficult problem to remove the shell of the shrimp therefrom in conventional forms of peeling machines, since if a shell is tightly fastened to the meat of the shrimp, the latter is frequently damaged by the peeling or shell removing operation of the conventional machine. This apparatus either removes the shell entirely without damaging the meat or at least, in even the most obdurate cases, loosens the end of the shell upon the shrimp to render more effective and more gentle the peeling operation of the usual shrimp cleaning and peeling machine. This loosening or removing action as effected by this apparatus is especially characterized by the turbulence of boiling of the water because of the cross sprays and injections of fluid therethrough from the fluid inlet means 36 which causes the shrimp to be tumbled about against the relatively more yieldable surface of the linings 38, 40 or of the belt flights, and by the turbulence of the water and cleaning fluids during this tumbling of the shrimp as the cleaning fluids penetrate between the shell and meat of the shrimp.

The members 10 of both forms of the invention shown in FIGURES 1–4 and 5–8 may be in the form of troughs, channels or tunnels and the term "channel-like structure" is employed in this specification and in the claims is employed as being generic to and as comprehending within itself all such forms. Further, the term fluid inlet means is specifically intended to include and embrace within its scope such structures as ports or apertures or adjustably positioned nozzles.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An apparatus for cleaning shrimp comprising a channel-like structure having side and bottom walls and along which shrimp are adapted to pass and having an inlet for the entry of shrimp to be cleaned and an outlet for discharging cleaned shrimp, at least one of said side and bottom walls having roughened surfaces for engagement by said shrimp whereby to facilitate removal of the shell of the shrimp, a plurality of fluid inlet means located in said side walls and extending from the outside of the latter therethrough and to the interior thereof and positioned to direct a stream of cleaning fluid into and transversely across said channel-like structure and at a distance from said bottom wall which is sufficient to strike shrimp passing along said channel-like structure for thereby cleaning said shrimp.

2. The combination of claim 1 wherein said fluid inlet means are disposed upon both sides of said channel-like structure and are staggered relative to each other whereby to repeatedly throw the shrimp back and forth across said structure during their passage therealong.

3. The combination of claim 1 including a header extending along said channel-like structure for supplying cleaning fluid to said fluid inlet means.

4. The combination of claim 1 including means operatively associated with said channel-like structure for supporting and conveying shrimp through said structure and past said fluid inlet means.

5. An apparatus for cleaning shrimp comprising a channel-like structure having side and bottom walls and along which shrimp are adapted to pass and having an inlet for the entry of shrimp to be cleaned and an outlet for discharging cleaned shrimp, a plurality of fluid inlet means located in said side walls and extending from the outside of the latter therethrough and to the interior thereof and positioned to direct a stream of cleaning fluid into and transversely across said channel-like structure and at a distance from said bottom wall which is sufficient to strike shrimp passing along said channel-like structure for thereby cleaning said shrimp, means for supporting and conveying shrimp through said channel-like structure and past said fluid inlet means, said means including partitions extending transversely of said structure and defining with the walls thereof compartments containing shrimp to be treated.

6. An apparatus for cleaning shrimp comprising a channel-like structure having side and bottom walls and along which shrimp are adapted to pass and having an inlet for the entry of shrimp to be cleaned and an outlet for discharging cleaned shrimp, a plurality of fluid inlet means located in said side walls and extending from the outside of the latter therethrough and to the interior thereof and positioned to direct a stream of cleaning fluid into and transversely across said channel-like structure and at a distance from said bottom wall which is sufficient to strike shrimp passing along said channel-like structure for thereby cleaning said shrimp, means for supporting and conveying shrimp through said channel-like structure and past said fluid inlet means, said means comprising a conveyor belt having a flight mounted for passage through said structure and supporting shrimp thereon.

7. The combination of claim 6 wherein, said flight extends across substantially the entire width of said structure.

8. The combination of claim 7 wherein said belt includes shrimp receiving compartments open at the sides of the structure for exposing the shrimp therein to the cleaning fluid discharged from said fluid inlet means.

9. An apparatus for cleaning shrimp comprising a channel-like structure having side and bottom walls and along which shrimp are adapted to pass and having an inlet for the entry of shrimp to be cleaned and an outlet for discharging cleaned shrimp, a plurality of fluid inlet means located in said side walls and extending from the outside of the latter therethrough and to the interior thereof and positioned to direct a stream of cleaning fluid into and transversely across said channel-like structure and at a distance from said bottom wall which is sufficient to strike shrimp passing along said channel-like structure for thereby cleaning said shrimp, a lining of roughened and ridged material secured to inside surfaces of said channel-like structure whereby shrimp passing through the structure will rub thereagainst and have their shells loosened.

10. The combination of claim 9 wherein said lining is disposed upon the sides and bottom surfaces of the structure.

11. An apparatus for cleaning shrimp comprising a channel-like structure having side and bottom walls and along which shrimp are adapted to pass and having an inlet for the entry of shrimp to be cleaned and an outlet for discharging cleaned shrimp, a plurality of fluid inlet means located in said side walls and extending from the outside of the latter therethrough and to the interior thereof and positioned to direct a stream of cleaning fluid into and transversely across said channel-like structure and at a distance from said bottom wall which is sufficient to strike shrimp passing along said channel-like structure for thereby cleaning said shrimp, a lining of roughened and ridged material secured to inside surfaces of said channel-like structure whereby shrimp passing through the structure will rub thereagainst and have their shells loosened, said lining extending throughout the length of said structure.

12. An apparatus for cleaning shrimp comprising a channel-like structure having side and bottom walls and along which shrimp are adapted to pass and having an inlet for the entry of shrimp to be cleaned and an outlet for discharging cleaned shrimp, a plurality of fluid inlet means located in said side walls and extending from the outside of the latter therethrough and to the interior thereof and positioned to direct a stream of cleaning fluid into and transversely across said channel-like structure and at a distance from said bottom wall which is sufficient to strike shrimp passing along said channel-like structure for thereby cleaning said shrimp, a header extending along said channel-like structure for supplying cleaning fluid to said fluid inlet means, a lining of roughened and ridged material secured to inside surfaces of said structure whereby shrimp passing through the structure will rub thereagainst and have their shells loosened.

13. The combination of claim 12 wherein said lining is disposed upon the sides and bottom surfaces of the structure.

14. The combination of claim 13 wherein said lining extends throughout the length of said structure.

15. The combination of claim 1 wherein said channel-like structure has a removable cover for the top of the same.

16 An apparatus for cleaning shrimp comprising a channel-like structure having side and bottom walls and along which shrimp are adapted to pass and having an inlet for the entry of shrimp to be cleaned and an outlet for discharging cleaned shrimp, a plurality of fluid inlet means located in said side walls and extending from the outside of the latter therethrough and to the interior thereof and positioned to direct a stream of cleaning fluid into and transversely across said channel-like structure and at a distance from said bottom wall which is sufficient to strike shrimp passing along said channel-like structure for thereby cleaning said shrimp, a header extending along said channel-like structure for supplying cleaning fluid to said fluid inlet means, means operatively associated with said channel-like structure for supporting and conveying shrimp through said structure and past said fluid inlet means, said structure having side and bottom walls and a stationary lining of roughened and ridged material covering the inside surfaces of said side and bottom walls.

References Cited in the file of this patent
UNITED STATES PATENTS

| | | |
|---|---|---|
| 870,766 | Eaton | Nov. 12, 1907 |
| 1,023,700 | Williams et al. | Apr. 16, 1912 |
| 1,200,289 | Wittemann | Oct. 3, 1916 |
| 1,394,138 | Bost et al. | Oct. 18, 1921 |
| 1,534,188 | Rebechini | Apr. 21, 1925 |
| 1,583,034 | Valerius | May 4, 1926 |
| 1,676,306 | White | July 10, 1928 |
| 1,821,201 | Barry | Sept. 1, 1931 |
| 1,999,817 | Martin | Apr. 30, 1935 |
| 2,261,560 | Pellas et al. | Nov. 4, 1941 |
| 2,595,781 | Durham | May 6, 1952 |
| 2,816,319 | Martinez | Dec. 17, 1957 |
| 2,886,082 | Navari | May 12, 1959 |

FOREIGN PATENTS

| | | |
|---|---|---|
| 58,120 | Norway | June 28, 1937 |